Figure 1:
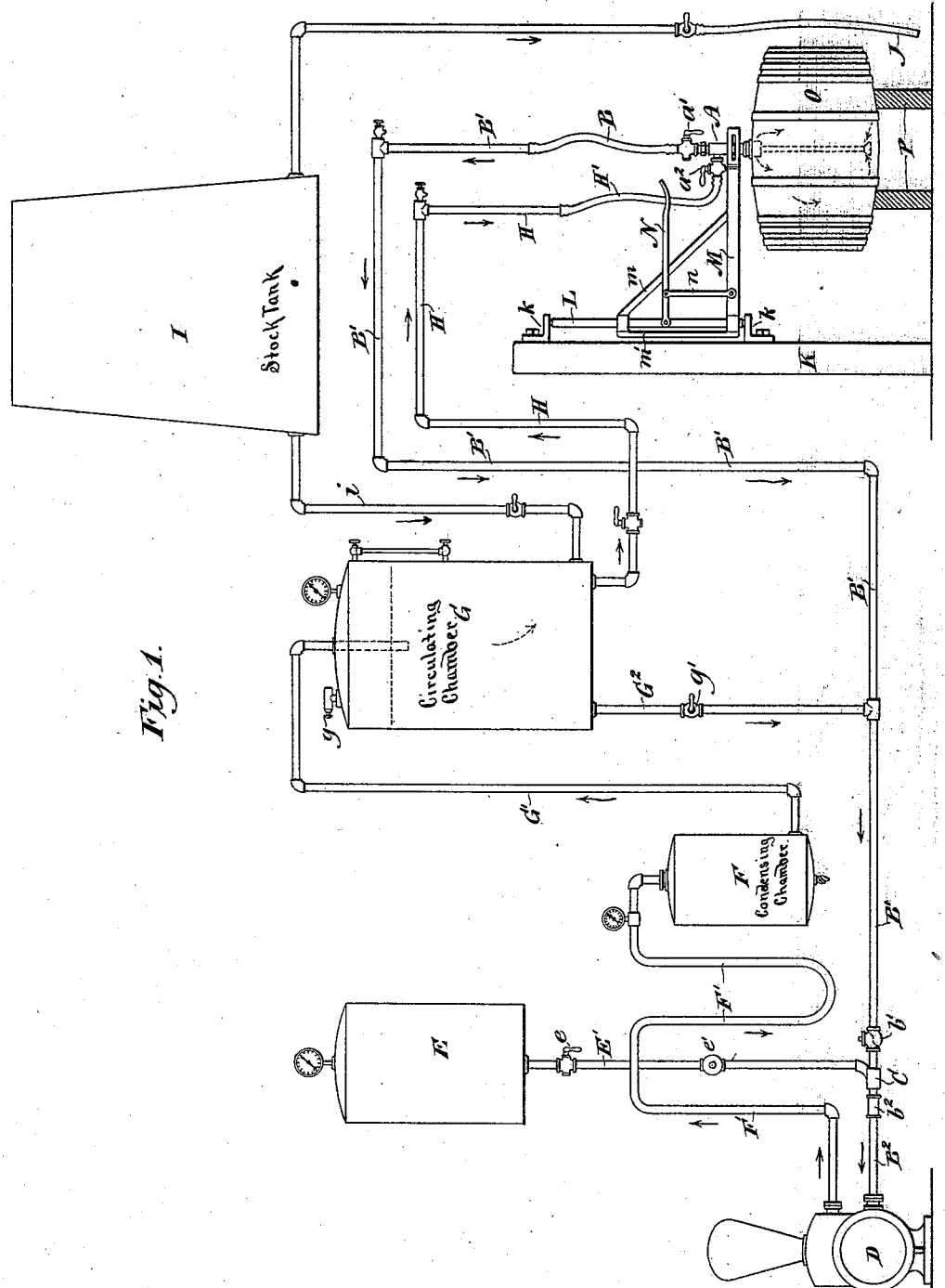

(No Model.) 3 Sheets—Sheet 1.

M. WARREN.
METHOD OF PREPARING BEER, &c., FOR CONSUMPTION.

No. 548,790. Patented Oct. 29, 1895.

Witnesses
Edward Thorpe.
W. W. Shaw.

Inventor
Marion Warren
By his Attorneys
Murphy & Metcalf

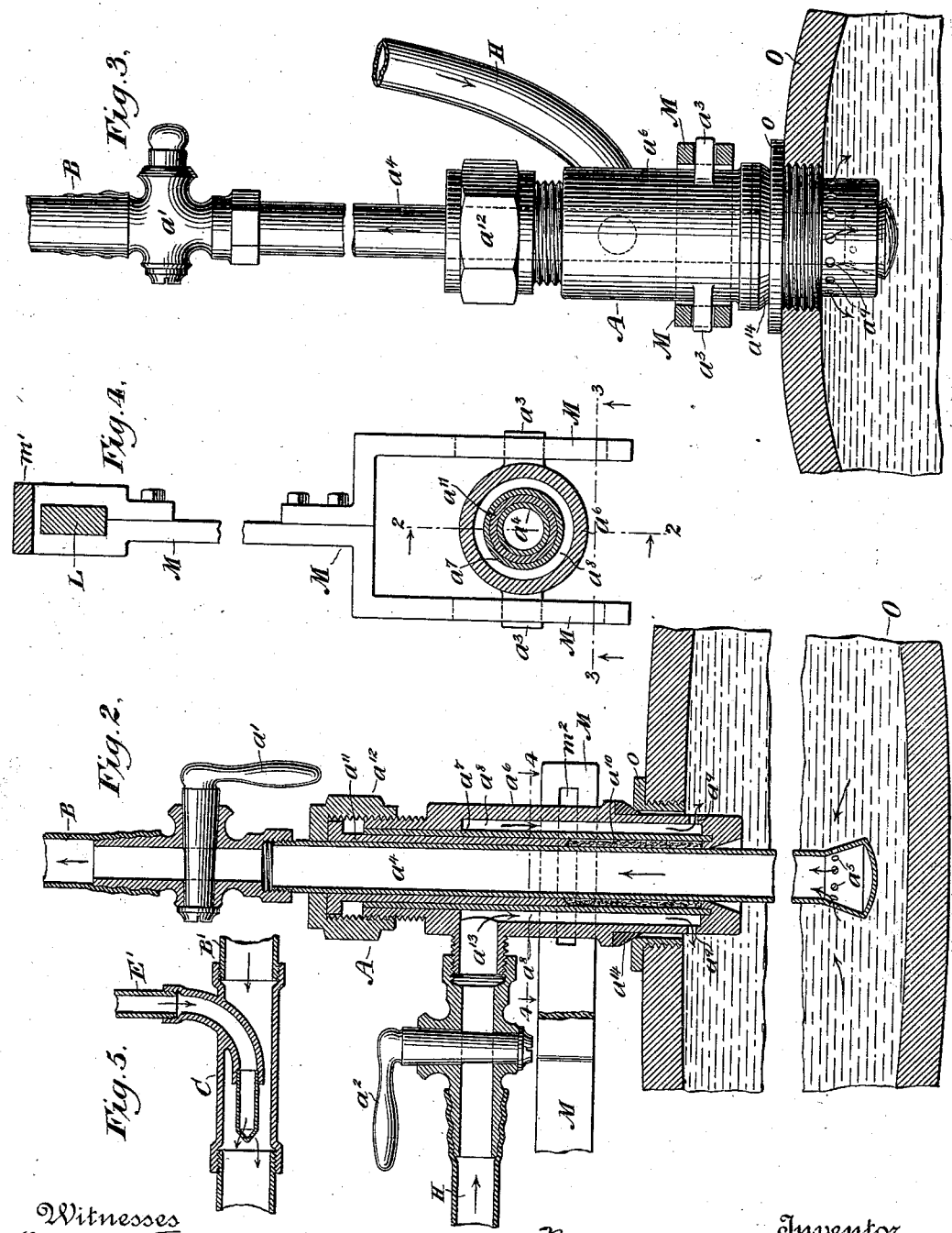

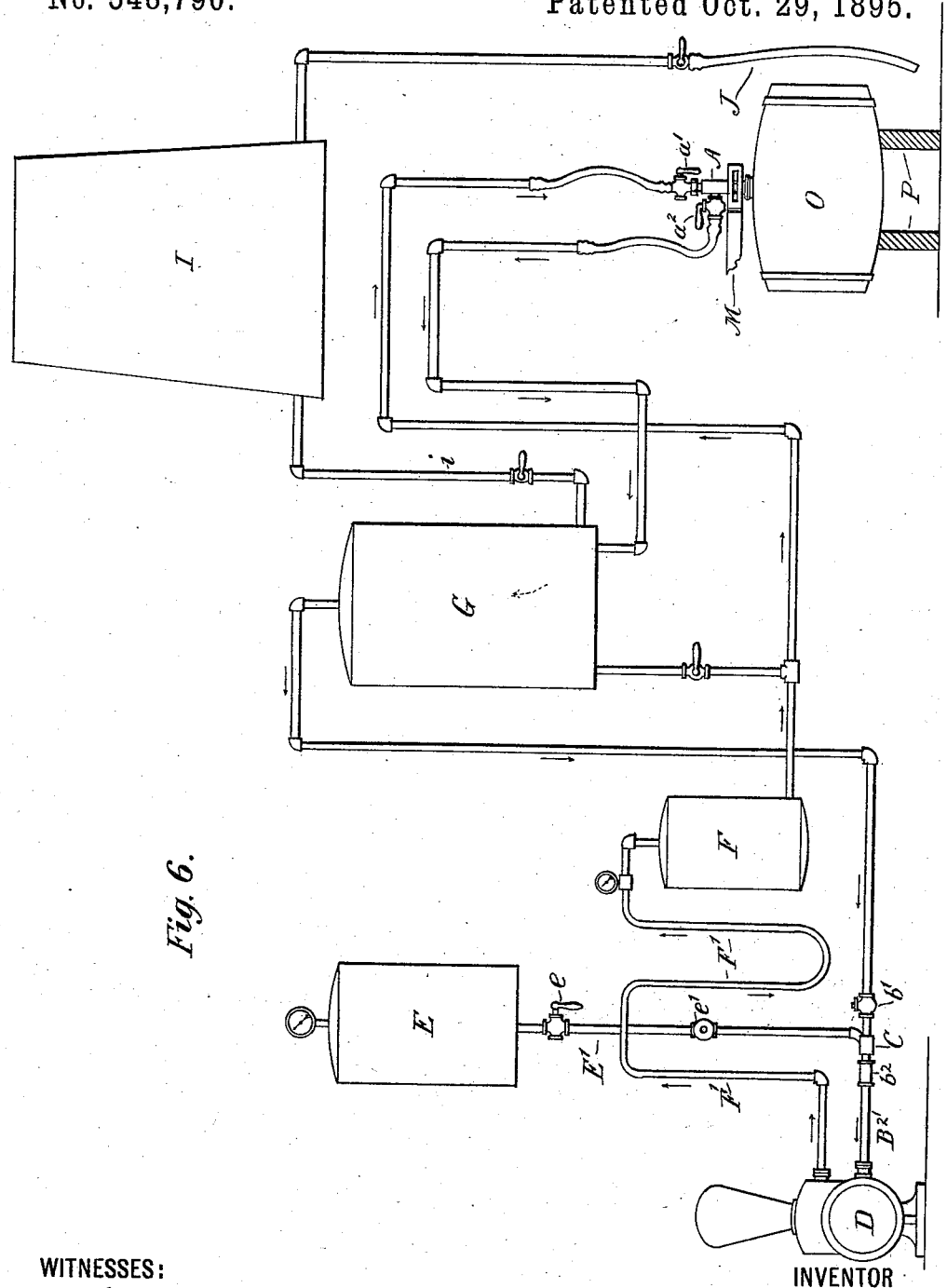

UNITED STATES PATENT OFFICE.

MARION WARREN, OF ROCHESTER, NEW YORK.

METHOD OF PREPARING BEER, &c., FOR CONSUMPTION.

SPECIFICATION forming part of Letters Patent No. 548,790, dated October 29, 1895.

Application filed August 9, 1894. Serial No. 519,804. (No model.)

*To all whom it may concern:*

Be it known that I, MARION WARREN, a citizen of the United States, residing in the city of Rochester, county of Monroe, and State of New York, have invented certain new and useful Improvements in Methods of Preparing Beer and Similar Carbonated Beverages for Consumption, of which the following is a full, clear, and exact description, reference being had to the accompanying drawings, forming part of this specification.

My invention relates to the preparation of carbonated beverages, such as lager-beer, for the market.

In the manufacture of lager-beer it was formerly the general practice, after the beer had passed through the main fermentation and the "ruh" or resting period, to place it in "chip" casks and add thereto a certain proportion of "kraeusen" or beer still undergoing the first fermentation, by means of which a secondary fermentation was started in the beer in the chip casks, and after this had proceeded for a certain length of time the chip casks were bunged up until the beer became sufficiently charged with the gas produced by the secondary fermentation, when it was racked off into the kegs or selling packages. The addition of the unripened kraeusen to the beer which has passed through the ruh period is and has always been considered detrimental to the essential qualities of the ripened beer, and within a comparatively-recent period persistent efforts have been made to dispense with the necessity therefor by artificially impregnating or charging the beverage with pure carbonic-acid gas. This artificial carbonation has been accomplished in various ways. One process, which up to a certain point has produced very satisfactory results, consists in filtering the beer after it has passed through the ruh period and injecting into it chemically-pure carbonic-acid gas, confining it in large casks, and then racking it off into the barrels, kegs, or selling packages. The beer thus treated possessed while in the large casks in a reasonable degree the essential requisites of "life" and "brilliancy," and much valuable time and labor were saved in comparison with older methods; but it has heretofore been found to be impossible to transfer this artificially-carbonated beer from the large casks to the selling or trade packages without the loss of so much of its gas as to render it in most instances deficient therein and unsatisfactory.

The primary object of my invention is to transfer the beverage, after it has become sufficiently charged by artificial means with carbonic-acid gas to fit it for consumption, directly into the trade or selling packages without the loss of an undue proportion of its gas; and to this end it consists in the novel method hereinafter described, and specifically set forth in the claims.

For the purpose of clearly describing my invention I have shown and shall describe the manner in which it is carried out in connection with a carbonating apparatus such as is now used; but I do not intend to limit its employment to that or any specific form of carbonator, nor to the specific method of artificial carbonation heretofore described, as it may be advantageously used for the treatment of beer which has been artificially charged with a small proportion of carbonic-acid gas after having been mildly "kraeusened" and bunged for a short period, the latter being a method sometimes practiced in which the old and newer processes are combined.

In the accompanying drawings, Figure 1 is a view in elevation of the apparatus which I employ in carrying my invention into effect. Fig. 2 is a vertical section of the filling apparatus in position in the package to be filled on the line 2 2, Fig. 4. Fig. 3 is an elevation thereof on the line 3 3, Fig. 4. Fig. 4 is a cross-section thereof on the line 4 4, Fig. 2. Fig. 5 is a vertical section of the gas-injector C, and Fig. 6 is a view in elevation showing a modification in the general arrangement of the apparatus.

Similar reference characters are employed to designate corresponding parts in all the views.

In said drawings, Fig. 1, A is the filling apparatus provided with two independent chambers communicating with different portions of the packages to be filled, connections between which and the circulating system of the carbonating apparatus now to be described being controlled by cocks $a'$ $a^2$, as will be presently more fully explained. The cock $a'$, which in Fig. 1 represents the outlet-valve of the filling apparatus, is connected by a hose connection B and pipe B' with the gas-injector C, which may be of any approved form. A pipe B² connects the injector C with the suction-chamber of the circulating-pump D. A check-valve $b'$ is arranged in the pipe B' to open toward the pump D, and in the pipe B² is placed a sight-glass $b^2$, through which the mixing of the beer and gas may be observed. The gas-injector C is also connected with the gas-reservoir E by pipe E'. The reservoir E contains carbonic-acid gas under a heavy pressure, usually of about one hundred and fifty pounds to the square inch. A stop-cock $e$ and a pressure regulating or reducing valve $e'$ are arranged in the pipe E', the object of the latter being to reduce the pressure of the gas to, say, five pounds or less to the square inch before it reaches the injector C.

The delivery port or chamber of the circulating-pump D is connected with a closed tank F, forming the condensing-chamber of the carbonating apparatus, through a suitable coil F'. The condensing-chamber F is connected with the upper portion of the circulating-chamber G by pipe G'. The chamber G is a closed tank provided with a gage-glass and pressure-gage and with a gas-escape or safety valve $g$, as shown. The lower portion of the circulating-chamber G is connected with the inlet-valve $a^2$ of the filling apparatus A by pipe H and hose H'.

I is a stock-tank of large capacity, holding, say, two hundred barrels, containing beer, which, in the particular process I am about to describe—namely, the treatment of beer carbonated solely by artificial means—has passed through the main fermentation and ruh periods and has been filtered and cooled ready for carbonation.

The stock-tank I is connected with the circulating-chamber G by pipe $i$. The filling-hose J is also suitably connected with the tank I. A by-pass G², provided with stop-valve $g'$, connects the chamber G with the pipe B'.

Secured to a suitable support, such as K, are brackets $k$ $k$, in which is pivotally mounted, so as to rotate therein on its longitudinal axis, the spindle L, preferably rectangular in cross-section. An arm M, having its inner end formed to embrace said spindle, is mounted thereon, so that it may be readily moved up and down on the spindle. The diagonal brace $m$ is connected at its lower end with the arm M and its upper end is formed to embrace the spindle L, so as to permit it also to slide freely up and down thereon, and the inner ends of the arm M and the brace $m$ are rigidly connected by the bar $m'$. A lever N is pivoted to the spindle L and is also pivotally connected to the arm M by the swinging link $n$. It will thus be observed that the arm M will rotate with the spindle L, and that if the outer end of the lever N, which is shaped to form a convenient handle, is lifted the arm M will be moved up on the spindle L, and that when the lever N is depressed the arm will be moved downwardly thereby, and that by reason of the rigid construction and bracing of the said arm and the leverage obtained by the lever N a heavy downward pressure may be exerted by the outer end of said arm by bearing down on the handle end of lever N. This outer end of the arm M is forked, as shown in Fig. 4, and is provided with slots $m^2$, into which project flanges $a^3$, formed on the body of the filling apparatus A. The slots $m^2$ are longer than the width of flanges $a^3$, which permits the filling apparatus to be moved back and forth in the slots, while vertical movement of the arm M will be imparted to the filling apparatus, so that the latter may be raised and lowered by moving the lever N and may be held firmly in its place in the package O by simply pressing down on the lever N.

O represents the package which is to be filled with the liquid. This may be of any suitable size or capacity and is provided with the bushing $o$, which receives the bung when the package is filled. A filling bench or rack P is arranged to support two or more of said packages under and in convenient proximity to the filling apparatus.

The filling apparatus which I preferably employ in carrying my process into effect consists of a sliding central tube $a^4$ of sufficient length to extend to the bottom of the package to be filled when the apparatus is in the position shown in Fig. 2. The lower end of the tube is closed, except for the perforations $a^5$. To the upper end of the tube $a^4$ is secured the cock $a'$, by which the circulation through said tube is controlled and to which is secured the hose connection B. The tube $a^4$ is carried by the chambered casing $a^6$, which forms the body of the filling apparatus. A section of tube $a^7$ is firmly secured in the casing $a^6$ by soldering or brazing, so as to leave between it and the interior of the casing $a^6$ an annular space $a^8$, at the lower end of which a series of perforations $a^9$ is formed, extending through the exterior wall of said casing. An annular space is also left between the exterior tube $a^4$ and the interior of tube $a^7$, the lower end of which is filled with any suitable packing material $a^{10}$, such as spindle-packing, and a follower $a^{11}$, against the upper end of which bears the screw-threaded cap $a^{12}$, serves to compress said packing, as required, to prevent leakage around the tube $a^4$. My object in providing this modified form of stuffing-box around the tube $a^4$ is to enable the tube to be moved up and down in the casing $a^6$ from the position shown in Fig. 2 to that shown in Fig. 3, in order that it may be instantly removed from the barrel by a very slight upward movement of the lever N and arm M. Communication between the interior of the package O and the circulating-chamber G is had through tube and hose connections H H', cock $a^2$, port $a^{13}$, annular chamber $a^8$, and perforations $a^9$. A gasket $a^{14}$, of rubber or other suitable material, surrounds the lower end of the casing $a^6$ below the shoulder formed thereon, so that when the filling apparatus is depressed by the lever N the gasket $a^{14}$ will be forced against the bushing $o$ and completely close the space between the filling apparatus and the bushing, thereby, with the cocks $a'$ and $a^2$ shut off, hermetically sealing the package O.

Having described the construction of my improved apparatus, I will now set forth the manner in which my process is performed in the treatment of beer which is carbonated by artificial means.

The stock-tank I is filled with beer which is ready to be carbonated, having passed through the first fermentation and ruh periods and been properly filtered and cooled. The valve in the pipe $i$, leading to the circulating-chamber, is then opened until the circulating-chamber is partially filled, the cocks $a'$ and $a^2$ being closed. The valve $g'$ in the by-pass $G^2$ is opened, the pump D is started, and the valve $e$ in the pipe $E'$, leading from the gas-tank E to the injector C, is opened, and the beer is drawn from chamber G through the injector C, where it is intimately charged with the carbonic-acid gas, and the beer thus charged is forced through pump D, coil F', condensing-chamber F, and into the circulating-chamber G. In the meantime the package O, which I contemplate shall be a trade-package—that is to say, the package in which the beer is finally delivered from the brewery, and which for the purpose of description I will call a keg—has been filled with the flat filtered beer from the stock-tank through the filling-hose J. As soon as all the beer which has been admitted to the circulating-chamber from tank I is sufficiently carbonated, (one circulation through the carbonating apparatus being ordinarily sufficient for this purpose,) the filling apparatus is inserted in the keg O, as shown in Fig. 3, with the cocks $a'$ and $a^2$ closed, the lever N is pressed down firmly, so that the package is, by the closure effected by gasket $a^{14}$, hermetically sealed to the atmosphere, the central tube $a^4$ is pushed down until the lower end thereof is in close proximity to the bottom of the package, the cocks $a'$ and $a^2$ are opened, and the valve $g'$ is closed, thus cutting off the circulation through by-pass $G^2$ and establishing communication between the circulating-chamber G and the upper portion of the keg O through pipe H and hose H', port $a^{13}$, chamber $a^8$, and perforations $a^9$, and also between the lower part of said package and the suction-chamber of the pump D through perforations $a^5$, tube $a^4$, and hose and pipe connections B B', injector C, and pipe $B^2$. The result is that the flat filtered beer with which the keg or package has been previously filled is drawn out at the bottom thereof and enters directly into the circulating system of the carbonating apparatus, passing through the gas-injector, pump, coil, and condensing-chamber into the circulating-chamber G, while the carbonated beer from the circulating-chamber enters the top of the keg as fast as the flat beer is drawn out. This operation is continued until the carbonated beer has completely replaced the flat beer, which can be readily determined by means of try-cocks or sight-glasses arranged in the outlet-pipe connections of the filling apparatus. As soon as the keg is filled with the carbonated beer, the valve $g'$ in by-pass $G^2$ is again opened, the cocks $a'$ and $a^2$ are closed, the tube $a^4$ is raised into its highest position, as shown in Fig. 3, the filling apparatus is lifted out of the bung-hole of the keg by means of lever N, the keg is closed immediately and permanently by driving in a wooden bung in the usual manner, and the beer is ready for the market. It is then removed from the filling-rack and an empty keg is put in its place. While the first keg has been filling, a second keg on the filling-rack (not shown in the drawings) has been filled with flat beer from the tank I through filling-hose J, and as soon as the filling apparatus is removed from the first keg it is swung over and placed in the second keg, and the operation above described is repeated continuously until the contents of tank I are exhausted. The beer can thus be placed and confined in the keg without the loss of any appreciable quantity of the gas with which it has been charged, and I have found by actual practice that by my process I can produce in approximately half the time heretofore required by the old methods and at much less expense a beer which is equal in all and in many respects superior to that heretofore manufactured.

I have shown in Fig. 6 a slight modification in the arrangement of the apparatus heretofore described. In this modification the beer is drawn from the circulating-chamber G to the pump and goes from the condenser F to the tube $a^4$ of the filling apparatus, entering the keg near the bottom instead of at the top, while the flat beer is drawn or forced from the top of the keg into the circulating-chamber G. In other words, the outlet and inlet of the filling apparatus A are reversed. This modified arrangement has been employed by me with marked success, although I prefer that first described. Various other obvious modifications in the form of the apparatus and manner of connecting it in carrying out my invention will occur to the experienced brew-master; but as these may be made without in any manner departing from the limits of my invention I will not describe them here.

It will be observed that the flat beer in the kegs goes directly into the circulating system of the carbonating apparatus and replaces the quantity of carbonated beer taken from the system to fill the keg, so that after the requisite quantity of flat beer has passed from the tank I into the circulating-chamber to start the apparatus no further supply from the stop-tank I directly through the pipe $i$ into said chamber is necessary, except to make up the very small quantity that may be lost in changing the apparatus from one keg to another.

The process above described is to be carried out in a cool atmosphere, and is most advantageously performed by two attendants, one to manipulate the filling apparatus and the other to place the empty kegs in position on the filling-bench, fill them with flat beer, bung each keg as soon as it is filled, and remove it from the rack.

By duplicating the filling apparatus the rapidity of the process is substantially unlimited.

Suitable valves, check-valves, and cocks may be arranged in the various pipes of the circulating system of the carbonating apparatus at such points as the experience of the operator may determine.

Having thus described my invention, what I claim as new, and desire to secure by Letters Patent, is—

1. The herein described method of preparing beer and other carbonated beverages for the market, which consists in carbonating the beverage for consumption, then establishing communication between a vessel or chamber containing said carbonated beverage and a trade package, which package is filled with the beverage which has not been subjected to the carbonating process and is closed to the atmosphere, then withdrawing said uncarbonated beverage from said package and simultaneously replacing it with the carbonated beverage and then permanently closing said package as by bunging, substantially as shown and described.

2. The herein described method of preparing beer and similar carbonated beverages for consumption, which consists in filling the trade package with the beverage wholly or partially uncarbonated, then closing said package to the atmosphere and establishing communication between the same and the circulatory system of the carbonating apparatus, then simultaneously removing said uncarbonated beverage from said package and filling the same with the beverage completely carbonated, then establishing circulation through the system outside the package and disconnecting the latter from said system, and finally closing said package as by bunging, substantially as shown and described.

3. The herein described method of preparing beer and similar carbonated beverages for consumption, which consists in filling the trade package with the beverage wholly or partially uncarbonated, then closing said package to the atmosphere and establishing communication between the same and the circulatory system of the carbonating apparatus, then withdrawing said uncarbonated beverage from the package into the circulatory system, and simultaneously introducing into said package the beverage which has been completely carbonated, then establishing circulation through the system outside the package and disconnecting the latter from said system and finally closing said package as by bunging, substantially as shown and described.

MARION WARREN.

Witnesses:
GEO. A. ELDER,
JAMES DUNLAP.